US009405770B2

(12) United States Patent
Seitz

(10) Patent No.: US 9,405,770 B2
(45) Date of Patent: Aug. 2, 2016

(54) THREE DIMENSIONAL NAVIGATION AMONG PHOTOS

(71) Applicant: Google Inc., Mountain View, CA (US)

(72) Inventor: Steven Maxwell Seitz, Seattle, WA (US)

(73) Assignee: Google Inc., Mountain View, CA (US)

( * ) Notice: Subject to any disclaimer, the term of this patent is extended or adjusted under 35 U.S.C. 154(b) by 131 days.

(21) Appl. No.: 14/202,638

(22) Filed: Mar. 10, 2014

(65) Prior Publication Data

US 2015/0254042 A1 Sep. 10, 2015

(51) Int. Cl.
G06K 9/54 (2006.01)
H04N 1/00 (2006.01)
G06F 12/00 (2006.01)
G06F 17/30 (2006.01)

(52) U.S. Cl.
CPC ...... G06F 17/30244 (2013.01); G09G 2340/12 (2013.01)

(58) Field of Classification Search
None
See application file for complete search history.

(56) References Cited

U.S. PATENT DOCUMENTS

| 8,515,159 | B2 | 8/2013 | Snavely et al. | |
|---|---|---|---|---|
| 8,624,974 | B2 | 1/2014 | Tsai et al. | |
| 9,196,072 | B2 * | 11/2015 | Oh | G06T 13/20 |
| 2006/0037990 | A1 * | 2/2006 | Geise | G01C 21/36 228/101 |
| 2010/0215250 | A1 * | 8/2010 | Zhu | G06T 17/05 382/154 |
| 2011/0216935 | A1 * | 9/2011 | Mays | G01C 21/3446 382/100 |
| 2012/0162253 | A1 * | 6/2012 | Collins | G06T 9/00 345/629 |
| 2014/0208208 | A1 * | 7/2014 | Chevallier | G06F 17/3079 715/720 |
| 2014/0295887 | A1 * | 10/2014 | Redfern | G01C 21/206 455/456.3 |
| 2014/0317511 | A1 * | 10/2014 | Bailiang | G06F 3/04842 715/730 |
| 2015/0116360 | A1 * | 4/2015 | Jones | G06T 11/60 345/634 |
| 2015/0248825 | A1 * | 9/2015 | Hanson | A61B 5/1117 348/77 |
| 2015/0278298 | A1 * | 10/2015 | Boldyrev | G06F 17/278 707/754 |

FOREIGN PATENT DOCUMENTS

| CA | 2801512 A1 | 7/2013 |
|---|---|---|
| EP | 0899691 B1 | 6/2001 |
| EP | 0753835 B1 | 9/2003 |
| EP | 2329312 A1 | 6/2011 |
| EP | 2405436 A2 | 1/2012 |
| EP | 2405437 A1 | 1/2012 |
| WO | 0208689 A1 | 1/2002 |
| WO | 2008060933 A9 | 8/2008 |
| WO | 2010025009 A1 | 3/2010 |

* cited by examiner

Primary Examiner — Randolph I Chu
(74) Attorney, Agent, or Firm — Lerner, David, Littenberg, Krumholz & Mentlik, LLP

(57) ABSTRACT

An exemplary method for navigating among photos includes determining, using one or more computing devices, visual characteristics of a person depicted in a first image associated with a first location. These visual characteristics of the person are detected in a second image associated with a second location. Using the one or more computing devices, a series of intermediate images are identified based on the first location and the second location. Each intermediate image is associated with a location. The series of intermediate images and the second image are provided. Images of an intermediate destination from the series of intermediate images are selected based on a density of images at the intermediate destination. A 3D reconstruction of the intermediate destination is then generated based on the selected images. Thereafter, a visual presentation of images traversing through the 3D reconstruction of the intermediate destination to the second image is prepared for display.

20 Claims, 8 Drawing Sheets

THREE DIMENSIONAL NAVIGATION AMONG PHOTOS

BACKGROUND

Mobile user devices such as cellular telephones and other mobile computing devices often include digital cameras among other features. Such devices marry the benefits of wireless access with electronic photography, and can associate each photo with a geographic location, such as the GPS coordinates at which image was captured. Using these mobile devices, a user may take pictures of friends and family, points of interest, etc., and share those pictures instantly. User may want to view these photos based on their geographic locations. For example, some systems can overlay photos on a map based on the location of where the photos were taken.

BRIEF SUMMARY

In one embodiment, a method for navigating among photos is provided. The method includes determining, using one or more computing devices, visual characteristics of a person depicted in a first image associated with a first location. Using the one or more computing devices, the visual characteristics of that person are detected in a second image associated with a second location. A series of intermediate images are identified based on the first location and the second location. Each intermediate image is associated with a corresponding location. Using the one or more computing devices, the series of intermediate images and the second image are provided.

In one example, a request is received to navigate through the series of intermediate images to the second image. In this regard, location information associated with the series of intermediate images overlaps with location information associated with a path from the first location to the second location. Images of an intermediate destination from the series of intermediate images are selected based on a density of images at that intermediate destination. In this example, a 3D reconstruction of the intermediate destination is then generated based on the selected images. Thereafter, a visual presentation of images traversing through the 3D reconstruction of the intermediate destination to the second image is prepared for display. The 3D reconstruction includes street level and aerial views of the intermediate destination.

In another embodiment, a non-transitory computer readable medium is provided. The non-transitory computer readable medium includes instructions that, when executed by a processor, cause the processor to perform a method. The method includes determining visual characteristics of a person depicted in a first image associated with a first location. The visual characteristics of that person are detected in a second image associated with a second location. A series of intermediate images are identified based on the first location and the second location. Each intermediate image is associated with a corresponding location. Thereafter, the series of intermediate images and the second image are provided.

In yet another embodiment, a system is provided. The system includes a memory and one or more processors coupled to the memory. The one or more processors are configured to determine visual characteristics of a person depicted in a first image associated with a first location. Using the one or more processors, the visual characteristics of that person are detected in a second image associated with a second location. A series of intermediate images are identified based on the first location and the second location. Each intermediate image is associated with a corresponding location. The series of intermediate images and the second image are provided.

DETAILED DESCRIPTION

Figure 1:
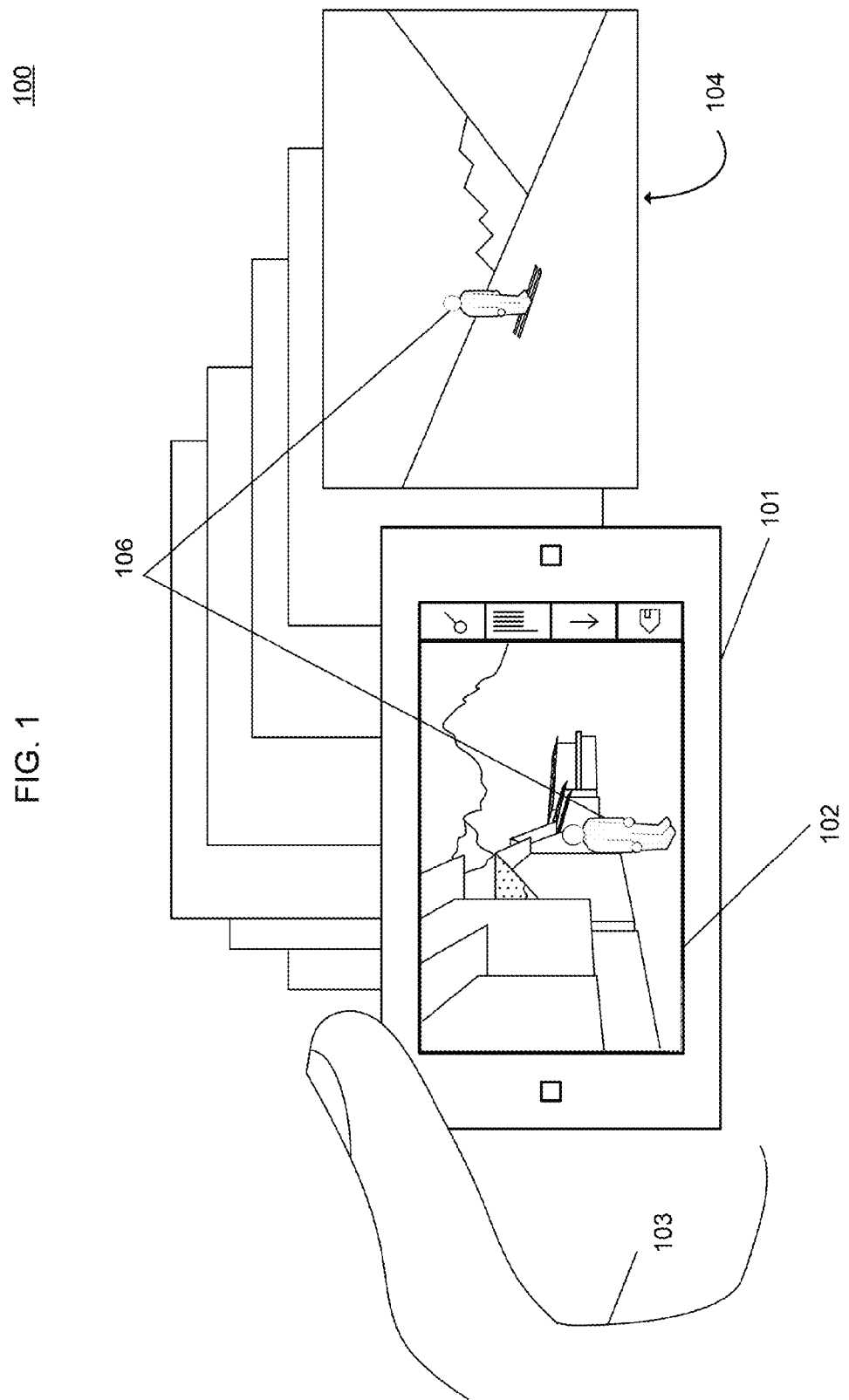
FIG. 1 is an illustration of an image capture process in accordance with aspects of the disclosure.

The present disclosure relates generally to providing a system for creating a three dimensional interactive experience that connects a user's geo-located photos with posted images (e.g., still or animated images, video, etc.) of related locations. In some embodiments, the posted images are shared with the user privately or the images are publicly available. Users may create a three dimensional tour of the world such that the user interactively navigates between their photos of different locations, while also zooming up, out, over and through views of one or more intermediate destinations rendered in the 3D model.

Three dimensional tours may be based on specific people in the users' photos, such as the user or, for example, a friend or relative of the user, who is situated at different locations. As such, landing photos, e.g., starting and ending photos, used in these tours may include an image of that person. In between the landing photos, the users can traverse a 3D model of images of intermediate destinations. In one aspect, the intermediate destinations may include geographic locations along a path from the starting and ending locations, or certain locations that may be of interest to the user, such as destinations that the user may want to explore while viewing other photos. These intermediate destinations may be popular destinations where a density of images is greater than that at other destinations. The intermediate images may also be images posted by the user or others that within proximity to selected geographic locations, and the images may be shown as or relative to a 3D model.

The 3D model may be a textured mesh that is rendered relative to the two landing points of the tour of user's photos, and may represent a visual geometry of the intermediate destinations that users may fly over or otherwise traverse while travelling between the two landing points. In some aspects, the 3D model includes street level views of the destinations. For example, these may be street level images captured and posted and/or shared by others. In addition, aerial views of the intermediate destinations may be incorporated into the 3D model, for example, images from various satellite and overhead sources. A visual presentation may then be displayed to the user as the user traverses the 3D model between their landing photos.

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

Example Methods

FIG. 1 is an illustration of an image capture process 100. For example, a user 103 may activate a camera associated with a mobile computing device 101, such as a mobile phone, for capturing images at different locations. As shown in FIG. 1, mobile computing device 101 includes a camera (not shown) for capturing images 102 and 104 that were taken at different locations. A typical captured image, such as images 102 and 104, includes objects (e.g., buildings, people and other background objects) present at the location when the images were taken.

Once the camera has captured these images, they may be stored locally at the mobile computing device 101 and/or transmitted to a server. In some aspects, user 103 may utilize an application associated with the mobile computing device 101 for uploading images to a social media web site or an image hosting service. In some embodiments, the user may have to install the application and/or select a service in order to obtain the benefits of the techniques described herein.

The application may be downloaded onto mobile computing device 101. For example, the user 103 may elect to download the application from a service associated with an online server. The mobile computing device 101 may transmit a request for the application over a network and in response, receive the application from the service. The application may be installed locally at the mobile computing device 101. Alternatively, the application can be stored at the service and may be accessed through the mobile computing device 101, for example, via a mobile web browser.

By using the application, user 103 may keep the images private, or publically post or otherwise share the images online. Likewise other users may have taken pictures at various locations and posted/shared these images online. In this regard, these images posted by other users may have also captured objects or surroundings at the locations. In some embodiments, these posted images can be used by the user 103 to create a three dimensional tour of certain locations relatively near to where the user's own photos were taken.

Three dimensional tours may include at least two landing photos. For example, the landing photos may be starting and ending photos in the tour. In some embodiments, the user may select these landing photos based on specific people in the photos. For example, here, the user's captured images 102 and 104 include a person 106, such as the user or a friend and/or relative of the user. In this regard, the tours may depict that person 106 at different locations. As shown in FIG. 1, image 102 depicts person 106 in a street scene, while image 104 depicts person 106 skiing down a mountain.

Specific visual characteristics of person 106 can be used as visual cues for selecting particular images as landing photos. For example, these visual characteristics may include a depiction of the person 106 in a particular position or displaying a certain gesture like raising a hand, or certain indefinable clothing worn by the person 106. In other situations, visual characteristics of the person themselves (e.g., facial features) may be used as the visual cues, e.g., so that the landing photos in the user-navigated tours include this specific person. In some embodiments, the visual characteristics can be detected in other potential landing photos, for example, by performing image analysis to detect the visual cues in other capture images.

Figure 2:
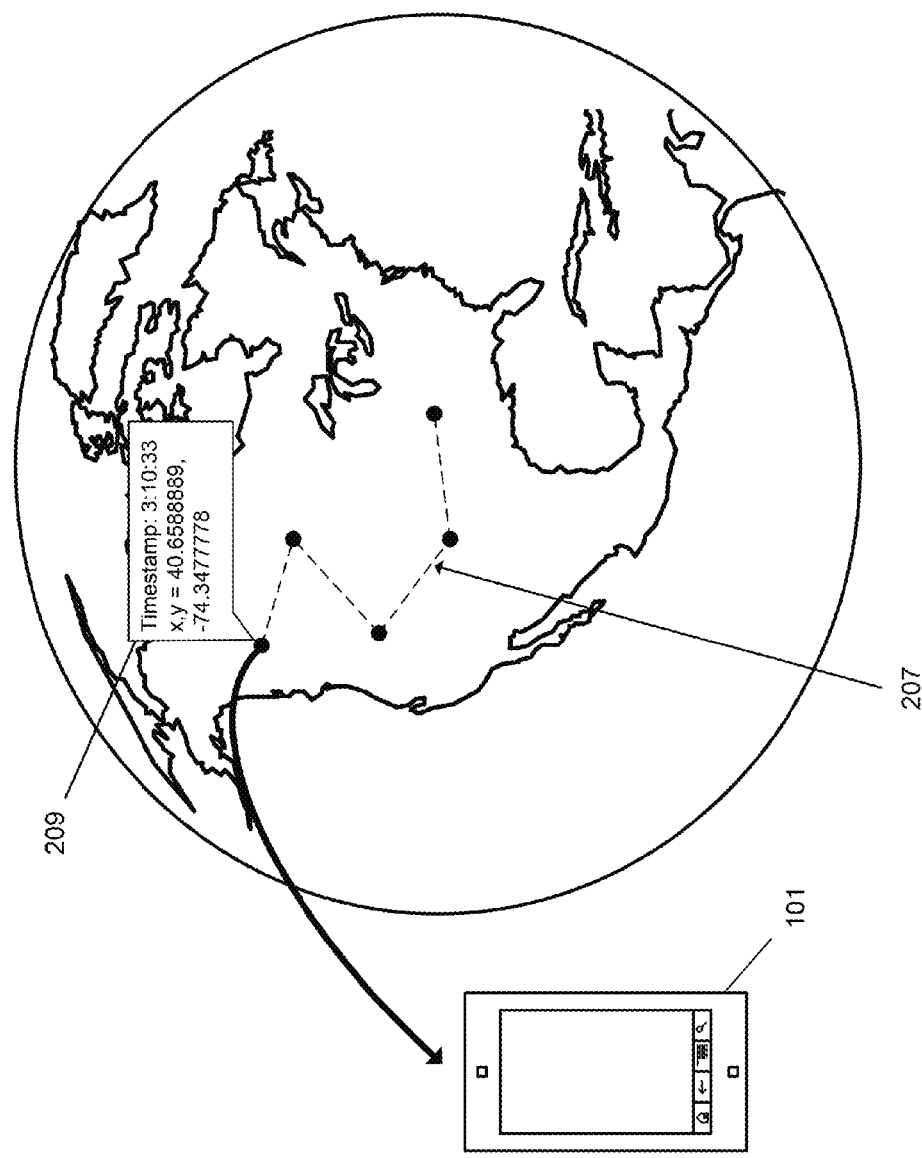
FIG. 2 is an illustration of orientation parameters for a device in accordance with aspects of the disclosure.

Locations associated with where the landing photos were taken may be determined based on the user's mobile device. As shown in FIG. 2, the mobile computing device 101 may include geographic positioning features for determining the current location of the device. These geographic positioning features may include, for example, GPS components, Wifi components, and/or Bluetooth or Bluetooth Low Energy components for identifying a current location (e.g., latitude and longitude position) of the mobile computing device 101 as it travels route 207. Once the current location is identified, the mobile computing device 101 may store location information 209. For example, the location information 209 can be stored by the mobile computing device 101 at set time intervals (e.g., every 30 seconds) or on demand by the user. The location information 209 may include one or more data fields, which include positioning information such as a global coordinate (e.g., latitude/longitude) and a timestamp indicating a time when the user of device 101 was at that coordinate. In some embodiments, this time and location information 209 may be stored with each photo captured at that location with the mobile computing device 101 as location data or other types of metadata.

Other types of metadata stored by the mobile computing device 101 may include information related to a view angle of the captured images. For example, viewing orientation parameters for the images can be determined based on the position of the device 101. For example, the computing device 101 may include one or more sensors (not shown), such as an accelerometer or gyroscope to determine the direction in which the device is oriented when an image is captured. Based on the sensor information, the device may determine its pitch, yaw or roll (or changes thereto) relative to the ground. Collectively, the pitch, roll and latitude/longitude angle define a camera pose or location and orientation. This and other image-related information may be outputted as numerical values by the sensors or other components in the device 101, used by the device's processors, and stored in the memory of the device 101 as well as with the captured images.

Once images are captured by mobile computing device 101, they can be used to locate a number of images of other corresponding locations that may be of interest to the user, such as some intermediate location the user may want to explore while viewing their own photos. These images of the intermediate locations may have been posted or shared by others. Relevant information regarding these posted images may be provided, for example, by a system for generating a 3D model based on these posted images. Aspects of this system are further described below with respect to FIG. 3.

Figure 3:
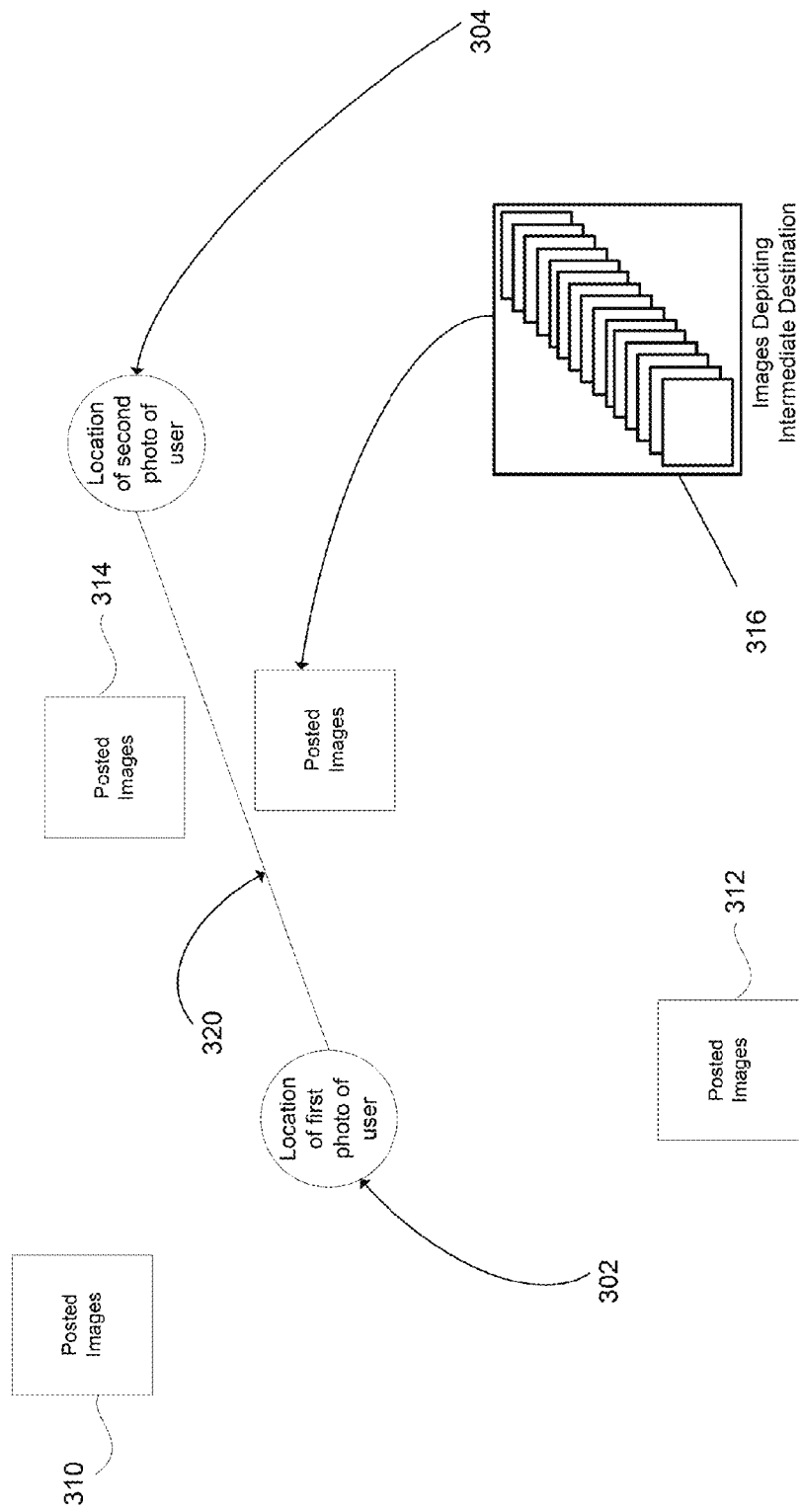
FIG. 3 is a functional diagram of posted images in accordance with aspects of the disclosure.

FIG. 3 is a functional diagram 300 of posted images 310-316. A system may identify these posted images 310-316 based on images captured with the user's GPS enabled device, such as mobile computing device 101 described with respect to FIG. 1. As discussed above, images captured by the user can be used as landing photos in a three dimensional tour. For example, the image taken at location 302 can be a first landing photo in the tour, while the image taken at location 304 may be the next landing photo in the tour. The user's device may record the coordinates (e.g., longitude and latitude coordinates) of the locations 302 and 304 where the user took these photos. In turn, the system may use this information to identify a number of posted images 314-316 for the intermediate locations. In some embodiments, in order for the user's device to associate a location with a photo, the user may be required to select a setting on the device.

As shown in FIG. 3, each block of posted images 310-316 represents one or more images taken at different intermediate locations. The system may identify some or all of these posted images as candidates to be used in the three dimensional tour. For example, images captured at different points along a path, such a path 320, from the first location 302 to the second location 304 can be selected as candidate images for the tour. In some embodiments, the candidate images may be chosen from images within a certain range of the path. For example, the system may select images that were taken within a predetermined range of path 320. This may be determined by comparing location data stored with the posted images with coordinates of the path for any overlap. In this regard, the predetermined range may be expressed in a unit of measurement, such as feet, meters, inches, miles, etc., that is within reach of the path.

In some aspects, several blocks of posted images can potentially be viable candidate images for the three dimensional tour. For example, the posted images at blocks 314 and 316 may be within the same range of path 320 so that either could be used in the tour. In this example, system may use additional information regarding the posted images to refine the selection of viable candidates. For example, the system may select a block of posted images where a density of the images captured at one location is greater than those captured at other locations associated with another block of posted images. Images at the denser block could indicate a visual popularity of that intermediate location and, thus the three dimensional tour using these photos may have richer details because there are more interesting things to see at that location.

As part of the three dimensional tour, users can traverse a model of one or more intermediate locations while traversing between the landing photos taken at the locations 302 and 304. For example, the model can be based on the posted images 316, which may indicate an area of interest to the user along the path 320 from the user's first photo to the user's second photo. Aspects of the 3D model are further described below.

Figure 4:
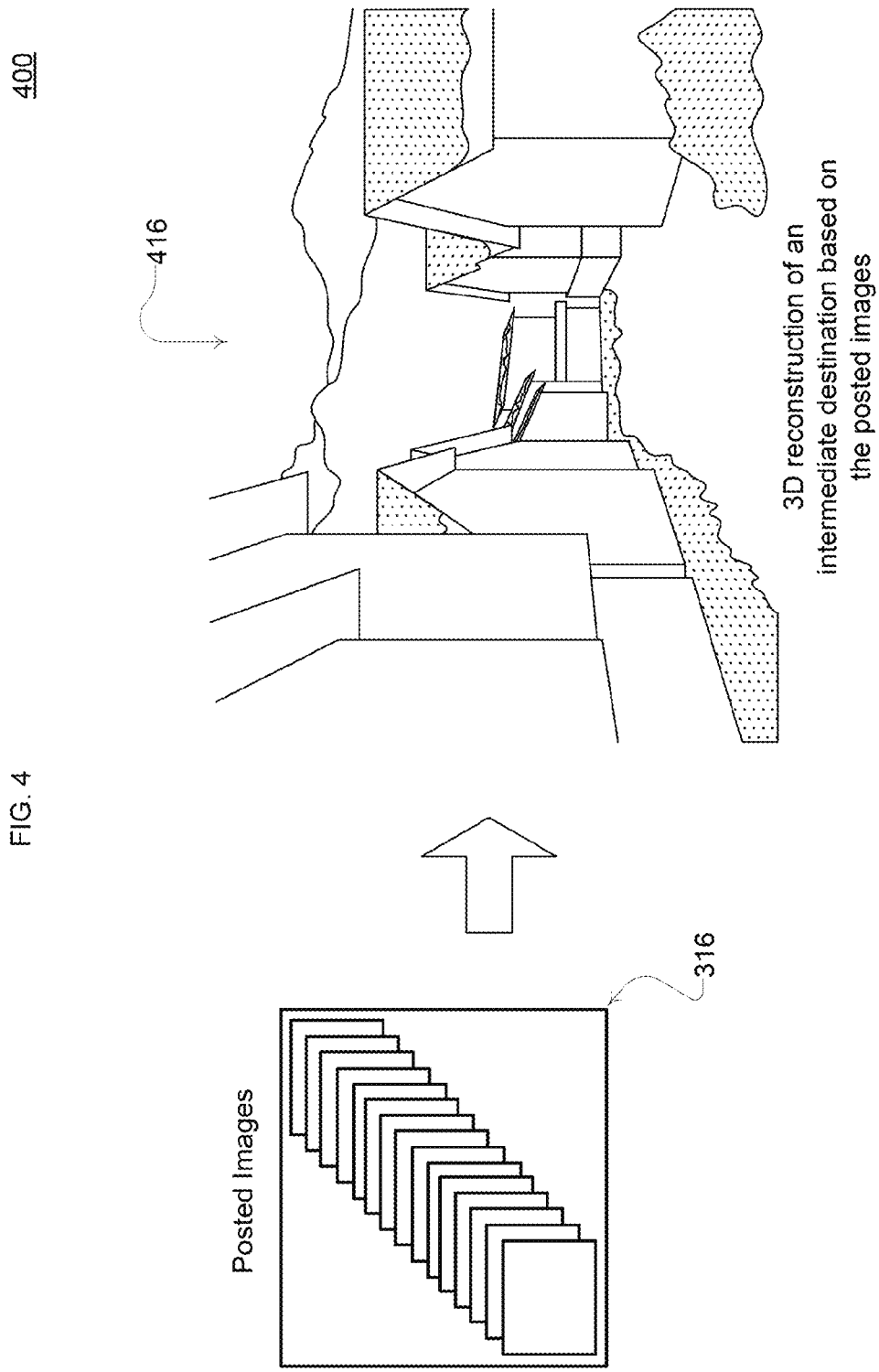
FIG. 4 is an illustration of a model in accordance with aspects of the disclosure.

FIG. 4 is an illustration of a model, such as a 3D model. For example, the 3D model represents a visual geometry of a location that users may traverse while travelling between landing photos. In some embodiments, the 3D model is a rendered mesh of two-dimensional image projections from the posted images. A mesh is a collection of vertices and edges that defined shapes of 3D objects in the images. As shown in FIG. 4, the posted images 316 include a number of image projections. Each image projections may include several related images that were, for example, captured and posted by others. When the image projections are assembled (e.g., warped together) using information stored with each candidate image, the 3D reconstruction 416 may be reconstructed depicting objects (e.g., people, buildings and background objects) present at the location where the images were taken.

Figure 5:
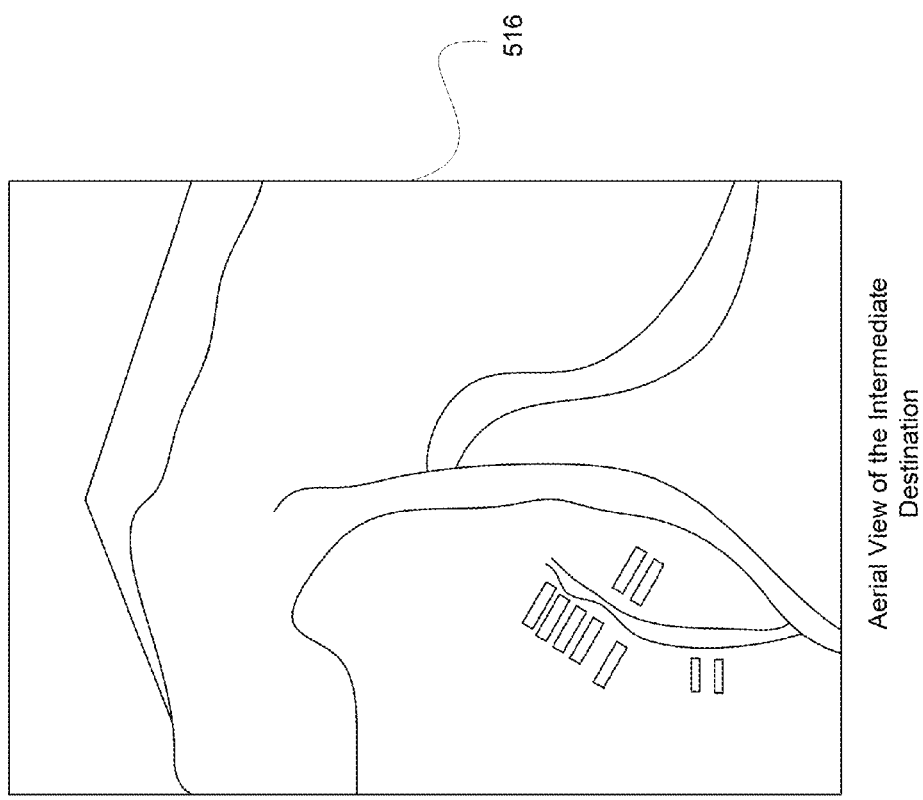
FIG. 5 is an illustration of an aerial view of the model depicted in FIG. 4 in accordance with aspects of the disclosure.

As shown in FIG. 4, the 3D model 416 may include a street level view of the location. For example, posted images used to generate the 3D model 416 may include various street level views. This allows the user to view the location at a level as if walking around at street level. Aerial views may also be included in the 3D model. For example, in FIG. 5 an aerial view 500 of the location depicted in FIG. 4 is shown. In this regard, satellite and/or overhead images of the location may be retrieved from a source and rendered into the model. This allows the user to fly over the intermediate locations as the user traverses from one landing photo to another.

Navigational controls (not shown) allow the user to zoom in, out, over and around the 3D model 416. For example, one or more navigational controls may be included that are operable to navigate between portions of the 3D model 416. The controls may include components on a touch screen display of the user's mobile device (e.g., directional arrows) that send navigation request to a system. In some embodiments, these controls may operate alone or in conjunction with input components associated with the device, such as a mouse and keyboard.

Figure 6:
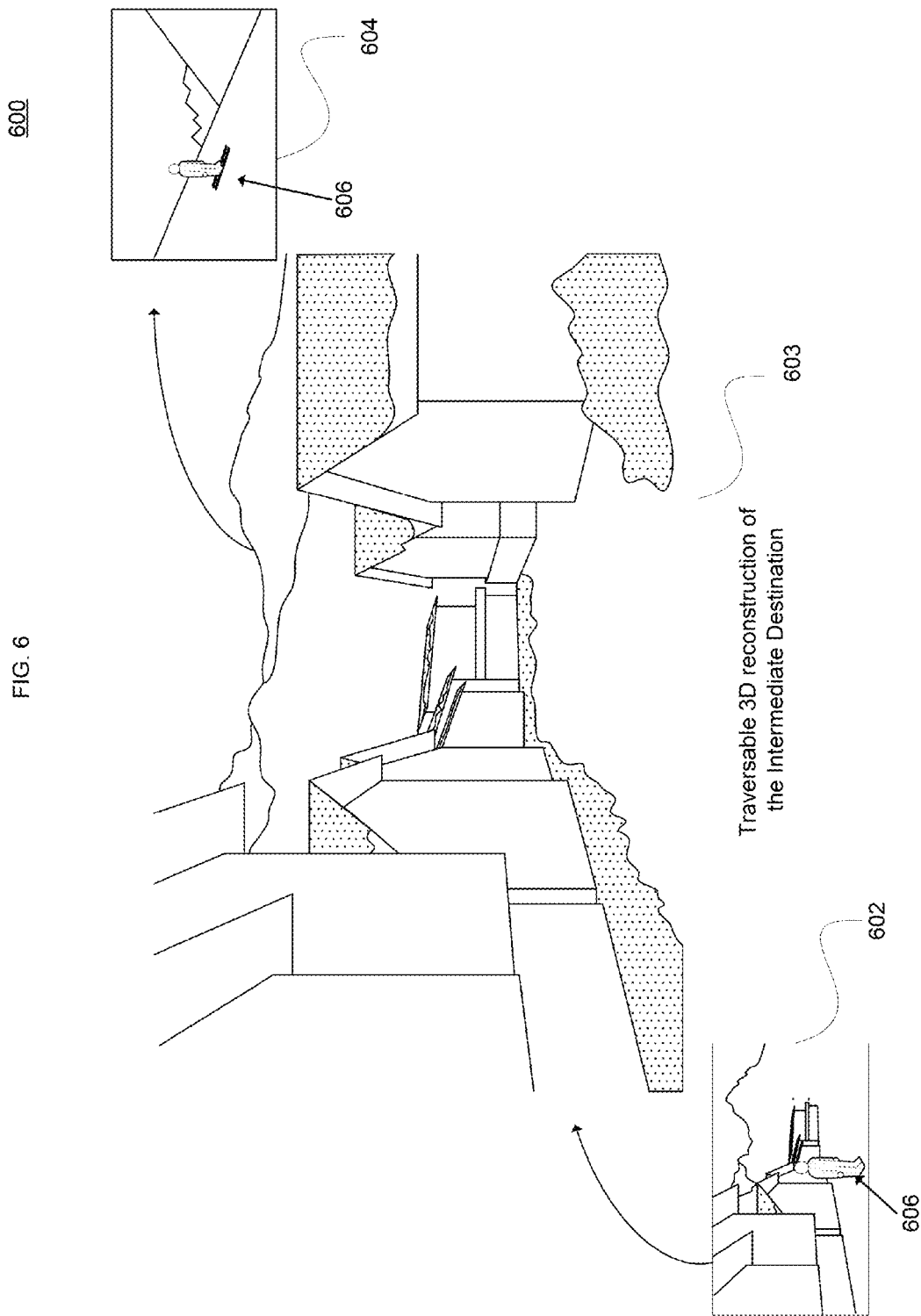
FIG. 6 is an illustration of a series of images in accordance with aspects of the disclosure.

In response to the user's request to navigate the three dimensional walking tour, a visual presentation of images is prepared. For example, in FIG. 6, a series of images 602-604 are shown. Here, the images include the user's landing photos 602 and 604 that include a person depicted at different locations. In some aspects, the user can traverse from one landing photo to another using person 606 in each landing photo as a visual cue. In between the landing photos 602 and 604, the users can traverse intermediate images from the 3D model 603. For example, the user can start at landing photo 602 of one location, then navigate through or fly over views from the 3D model 603 to land at the second landing photo 604 depicting that person 606 a different location. In some embodiments, this visual presentation may be presented on a display, for example, of the user's mobile device.

Example System

Figure 7:
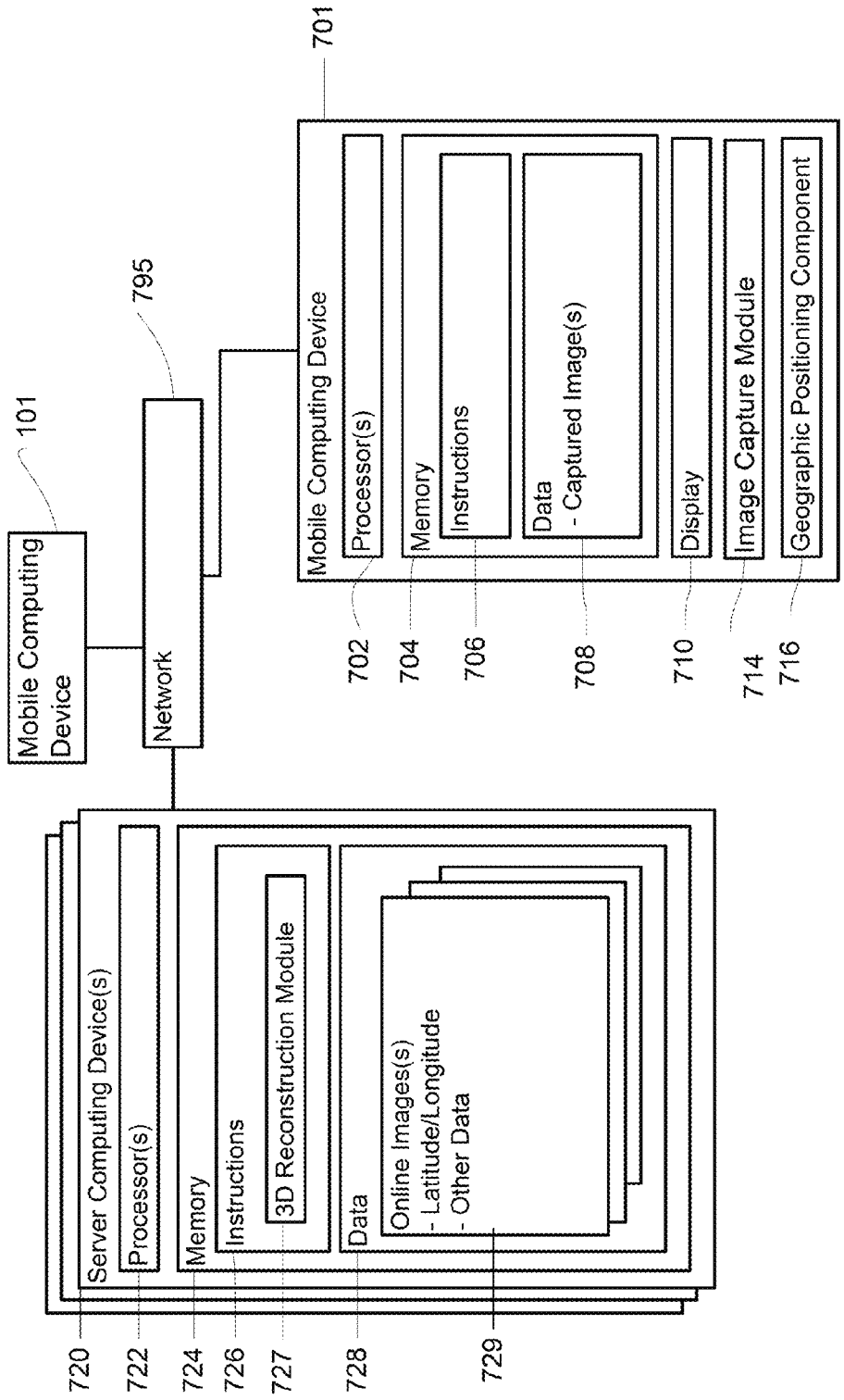
FIG. 7 is a block diagram of a system in accordance with aspects of the disclosure.

FIG. 7 is a block diagram of a system 700 that may be used for three dimensionally navigating photos with the user's mobile device as described above. As shown, the system 700 includes one or more server computing devices 720 coupled to a network 795 and a number of mobile computing devices, such as mobile computing devices 101 and 701, capable of communicating with the one or more server computing devices 720 over the network 795. The one or more server computing devices 720 may include one or more processors 722, memory 724, and other components typically present in general purpose computers.

The memory 724 of server computing device 720 may store information that is accessible by the processor 722, including instructions 726 that may be executed by the processor 722, and data 728. The memory 724 may be of a type of memory operative to store information accessible by the processor 722, including a non-transitory computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The subject matter disclosed herein may include different combinations of the foregoing, whereby different portions of the instructions 726 and data 728 are stored on different types of media.

Although FIG. 7 functionally illustrates the processor 722 and memory 724 as being within the same block, the processor 722 and memory 724 may actually include multiple processors and memories that may or may not be stored within the same physical housing. For example, some of the instructions 726 and data 728 may be stored on removable CD-ROM and others within a read-only computer chip. Some or all of the instructions and data may be stored in a location physically remote from, yet still accessible by, the processor 722. Similarly, the processor 722 may actually comprise a collection of processors, which may or may not operate in parallel.

For instance, various methods described below as involving a single component (e.g., processor 120) may involve a plurality of components (e.g., multiple computing devices distributed over a network of computing devices, computers, "racks," etc. as part of a parallel or distributed implementation). Further, the various functions performed by the embodiments may be executed by different computing devices at different times as load is shifted from among computing devices. Similarly, various methods described below as involving different components (e.g., device 101 and device 701) may involve a single component (e.g., rather than device 701 performing a determination described below, device 701 may send the relevant data to server 720 for processing and receive the results of the determination for further processing or display).

Data 728 may be retrieved, stored or modified by processor 722 in accordance with the instructions 726. For instance, although the present disclosure is not limited by a particular data structure, the data 728 may be stored in computer registers, in a relational database as a table having a plurality of different fields and records, XML documents, or flat files. The data 728 may also be formatted in a computer-readable format such as, but not limited to, binary values, ASCII or Unicode. By further way of example only, the data 728 may be stored as images comprised of pixels that are stored in compressed or uncompressed, or various image formats (e.g., JPEG), vector-based formats (e.g., SVG) or computer instructions for drawing graphics. For example, the data may include one or more candidate images 728, which may include information relevant to the images such as a timestamp, latitude/longitude coordinates and other data. Moreover, the data 728 may comprise information sufficient to identify the relevant information, such as numbers, descriptive text, proprietary codes, pointers, references to data stored in other memories (including other network locations) or information that is used by a function to calculate the relevant data.

The server computing device 720 may be at one node of network 795 and capable of directly and indirectly communicating with other nodes of the network 795. For example, the server computing device 720 may include a web server that may be capable of communicating with mobile computing devices 101 and 701 via network 795 such that it uses the network 795 to transmit and display information to a user on a display 710 of the mobile computing device 701. Server computing device 720 may also include a plurality of computers, e.g., a load balanced server farm, that exchange information with different nodes of a network for the purpose of receiving, processing and transmitting data to mobile computing devices 101 and 701. In this instance, the mobile computing devices 101 and 701 will typically still be at different nodes of the network 795 than the computers comprising server computing device 720.

The network 795, and intervening nodes, may include various configurations and protocols including the Internet, World Wide Web, intranets, virtual private networks, wide area networks, local networks, private networks using communication protocols proprietary to one or more companies, Ethernet, WiFi (e.g., 802.11, 802.11b, g, n, or other such standards), HTTP, and various combinations of the foregoing. Such communication may be facilitated by a device capable of transmitting data to and from other computers, such as modems (e.g., dial-up, cable or fiber optic) and wireless interfaces.

Although certain advantages are obtained when information is transmitted or received as noted above, other aspects of the subject matter disclosed herein are not limited to a particular manner of transmission of information. For example, in some aspects, information may be sent via a medium such as a disk, tape or CD-ROM. Yet further, although some functions are indicated as taking place on a single server having a single processor, various aspects may be implemented by a plurality of servers, for example, communicating information to mobile computing devices 101 and 701 over network 795.

Each mobile computing device 101 and 701 may be configured similarly to the server computing device 720, with a processor 702, memory 704, instructions 706, data 708 and all of the internal components normally found in a personal computer. By way of example only, the mobile computing device 701 may include a central processing unit (CPU), display device 710 (for example, a monitor having a screen, a projector, a touch-screen, a small LCD screen, a television, or another device such as an electrical device that is operable to display information processed by the processor 702), CD-ROM, hard-drive, user input (not shown), such as a keyboard, mouse, touch-screen or microphone, speakers, modem and/or network interface device (telephone, cable or otherwise) and all of the components used for connecting these elements to one another.

The mobile computing device 701 may be a computing device. For example, mobile computing device 701 may be a laptop computer, a netbook, a desktop computer, and a portable personal computer such as a wireless-enabled PDA, a tablet PC or another type of computing device capable of obtaining information via a network like the Internet. Although aspects of the disclosure generally relate to a single mobile computing device 701, the mobile computing device 701 may be implemented as multiple devices with both portable and non-portable components (e.g., software executing on a rack-mounted server with an interface for gathering location information).

Although the mobile computing device 701 may include a full-sized personal computer, the subject matter of the present disclosure may also be used in connection with mobile computing devices capable of wirelessly exchanging data. For example, mobile computing device 940 may be a wireless-enabled mobile computing device, such as a Smartphone, or an Internet-capable cellular phone. In either regard, the user may input information using a small keyboard, a keypad, a touch screen or other means of user input. In various aspects, the mobile computing devices and computers described herein may comprise a device capable of processing instructions and transmitting data to and from humans and other devices and computers.

The mobile computing device 701 may include a geographic positioning component 716, such as circuits, to determine a geographic location of the device 701. For example, the mobile computing device 701 may include a GPS receiver to determine the device's latitude and longitude position. As the mobile computing device 701 changes location, for example, by being physically moved, the GPS receiver may determine a new current location. In some aspects, based on the determined current location of device 701, one or more GPS timestamps may be recorded, for example, in data 708. The GPS timestamps may indicate a time and location associated with a past location visited by a user of the device 701. By way of example only, the component 716 may include software for determining the location of the device based on other signals received at the mobile computing device 701, such as signals received at a cell phone's antenna from one or more cell phone towers if the mobile computing device is a cell phone. In that regard, the provision of location identification data may occur automatically based on information received from such a component.

As shown in FIG. 7, the mobile computing device 701 may also include an image capture module 714. The image capture module 714 can be used to capture images and/or video images of an object, which can be stored in data 708. The image capture module 714 may be a software module operable in conjunction with a video camera or may include a video graphing device, such as a video digital camera having image processing components. For example, the mobile computing device 701 may be connected to a video digital camera that can operate in conjunction with the image capture module 714. The image capture module 714 can also operate in conjunction with other image capturing systems known in the arts such as a digital camera with image and/or video capture capabilities, a camera in a mobile phone, a video camera or other devices with image capturing features.

The instructions 706 and 726 of the computing devices may be a set of instructions to be executed directly (such as machine code) or indirectly (such as scripts) by the processor. In that regard, the terms "instructions," "steps" and "programs" may be used interchangeably herein. The instructions 706 and 726 may be stored in object code format for direct processing by the processor, or in another computer language including scripts or collections of independent source code modules that are interpreted on demand or compiled in advance. Functions, methods and routines of the instructions are explained in more detail below.

In order to facilitate the operations of system 700 for traversing a 3D model of a location, the server computing device 720 may further include a 3D reconstruction module 727 for creating a textured mesh 3D model of a location using posted images. The functionally of the 3D reconstruction module 727 can exist in a fewer or greater number of modules than what is shown, with such modules residing at one or more computing devices, which may be geographically dispersed. The modules may be operable in conjunction with mobile computing device 701 from which it may receive captured images depicting a location and relevant information regarding those images. Thereupon, an association between these images and the 3D models of related locations may be determined in order to create a virtual walking tour.

Example Flow Diagrams

Techniques for creating a three dimensionally interactive experience that connects user geo-located photos with a 3D model of related locations, for example using system 700 discussed above, will now be described. As previously discussed, the following operations do not have to be performed in the precise order described below. Rather, as mentioned above, various operations can be handled in a different order or simultaneously, and operations may be added or omitted.

Figure 8:
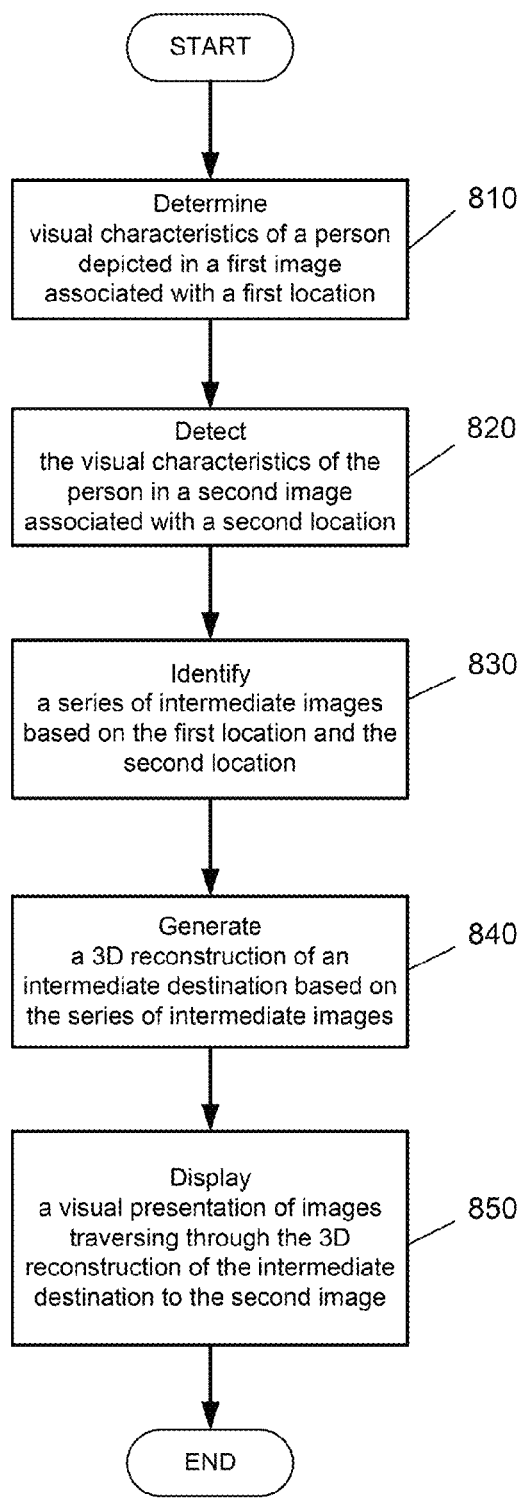
FIG. 8 is a flow diagram depicting an example of a method in accordance with aspects of the disclosure.

FIG. 8 is a flow diagram 800 depicting an example of some of the aspects described above for creating a three dimensional interactive experience cued off of a user's photos. In block 810, visual characteristics of a person depicted in a first images associated with a first location are determined. For example, these visual characteristics are used as visual cues for selecting a particular image as a starting photo in a 3D navigational photo tour. For example, these visual characteristics may include physical attributes of the person or identifiable objects worn or carried by the person.

In block 820, the visual characteristics of the person are detected in a second image associated with a second location. For example, the visual characteristics can be detected in another user photo using an image analysis technique to search for corresponding visual cues. In this regard, the other photos may be stored in memory or on a connected server. The visual cues from the photo at stage 810 are compared to other photos in order to determine whether there is a match. In some aspect, if the number of corresponding visual cues between the two photos is above a predetermined threshold then the second image is considered a match.

In block 830, a series of intermediate images are identified based on the first and second locations. For example, a number of posted images depicting an intermediate location taken within a predetermined range of a path between the first and second locations may be selected. These images may be of a popular destination where a density of images is greater than that at other destinations.

In block 840, a 3D reconstruction of an intermediate destination is generated based on the series of intermediate images. For example, the 3D reconstruction is a textured mesh 3D model of the intermediate destination depicted in the series of intermediate images. When the intermediate images are assembled together, the 3D reconstruction may depict objects present at the intermediate destination. In this regarding, the 3D reconstruction includes street level and aerial views of the intermediate destination.

In block 850, a visual presentation of images traversing through the 3D reconstruction of the intermediate destination to the second image is prepared for display. For example, in response to the user's navigation request, images may be presented on the user's mobile device display. In this regard, the user is able to navigate up, over and through the 3D reconstruction of the intermediate destination to the second image of the second location and thereon.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended

The invention claimed is:

1. A method for navigating among photos, comprising:
    determining, using one or more computing devices, visual characteristics of a person depicted in a first image associated with a first location;
    detecting, using the one or more computing devices, the visual characteristics of the person in a second image associated with a second location;
    identifying, using the one or more computing devices, a series of intermediate images based on the first location and the second location, each intermediate image being associated with a corresponding location; and
    providing, using the one or more computing devices, the series of intermediate images and the second image.

2. The method of claim 1, wherein providing comprises receiving a request to navigate through the series of intermediate images to the second image.

3. The method of claim 1, wherein location information associated the series of intermediate images overlaps with location information associated with a path from the first location to the second location.

4. The method of claim 1, further comprising selecting images of an intermediate destination from the series of intermediate images based on a density of images at the intermediate destination.

5. The method of claim 4, further comprising generating a 3D reconstruction of the intermediate destination based on the selected images, the 3D reconstruction representing a geometry of the intermediate destination.

6. The method of claim 5, wherein the 3D reconstruction includes street level views of the intermediate destination.

7. The method of claim 6, wherein the 3D reconstruction includes aerial views of the intermediate destination.

8. The method of claim 5, further comprising preparing a visual presentation of images traversing through the 3D reconstruction of the intermediate destination to the second image.

9. A non-transitory computer readable medium, storing instructions that, when executed by one or more processors, cause the one or more processors to perform a method for navigating among photos, the method comprising:
- determining, using one or more computing devices, visual characteristics of a person depicted in a first image associated with a first location;
- detecting, using the one or more computing devices, the visual characteristics of the person in a second image associated with a second location;
- identifying, using the one or more computing devices, a series of intermediate images based on the first location and the second location, each intermediate image being associated with a corresponding location; and
- providing, using the one or more computing devices, the series of intermediate images and the second image.

10. The non-transitory computer readable medium of claim 9, further comprising selecting images of an intermediate destination from the series of intermediate images based on a density of images at the intermediate destination.

11. The non-transitory computer readable medium of claim 10, further comprising generating a 3D reconstruction of the intermediate destination based on the selected images, the 3D reconstruction representing a geometry of the intermediate destination.

12. The non-transitory computer readable medium of claim 11, wherein the 3D reconstruction includes street level views of the intermediate destination.

13. The non-transitory computer readable medium of claim 12, wherein the 3D reconstruction includes aerial views of the intermediate destination.

14. A system for navigating among photos, comprising:
- a memory; and
- one or more processors coupled to the memory, the one or more processors being configured to:
- determine visual characteristics of a person depicted in a first image associated with a first location;
- detect the visual characteristics of the person in a second image associated with a second location;
- identify a series of intermediate images based on the first location and the second location, each intermediate image being associated with a corresponding location; and
- provide the series of intermediate images and the second image.

15. The system of claim 14, wherein location information associated the series of intermediate images overlaps with location information associated with a path from the first location to the second location.

16. The system of claim 14, wherein the one or more processors are further configured to select images of an intermediate destination from the series of intermediate images based on a density of images at the intermediate destination.

17. The system of claim 16, wherein the one or more processors are further configured to generate a 3D reconstruction of the intermediate destination based on the selected images, the 3D reconstruction representing a geometry of the intermediate destination.

18. The system of claim 17, wherein the 3D reconstruction includes street level views of the intermediate destination.

19. The system of claim 18, wherein the 3D reconstruction includes aerial views of the intermediate destination.

20. The system of claim 17, wherein the one or more processors are further configured to prepare a visual presentation of images traversing through the 3D reconstruction of the intermediate destination to the second image.

* * * * *